United States Patent
Yamazaki (10) Patent No.: US 6,882,184 B2
(45) Date of Patent: Apr. 19, 2005

(54) CLOCK SWITCHING CIRCUIT

(75) Inventor: Atsushi Yamazaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/456,781

(22) Filed: Jun. 9, 2003

(65) Prior Publication Data

US 2004/0095166 A1 May 20, 2004

(30) Foreign Application Priority Data

Nov. 18, 2002 (JP) ........................................ 2002-333558

(51) Int. Cl.⁷ .............................................. H03K 17/00
(52) U.S. Cl. ........................ 327/99; 327/294; 327/298; 327/407
(58) Field of Search ........................ 327/99, 298, 166, 327/165, 291, 293, 294, 100, 218, 407, 141, 144, 145, 154; 326/46, 93, 94, 96; 331/49, 141

(56) References Cited

U.S. PATENT DOCUMENTS

| | | | | |
|---|---|---|---|---|
| 5,315,181 A | * | 5/1994 | Schowe | 326/93 |
| 5,623,223 A | * | 4/1997 | Pasqualini | 327/298 |
| 5,652,536 A | * | 7/1997 | Nookala et al. | 327/298 |
| 5,790,609 A | | 8/1998 | Swoboda | 375/357 |
| 5,903,746 A | * | 5/1999 | Swoboda et al. | 395/556 |
| 6,107,841 A | * | 8/2000 | Goodnow | 327/99 |
| 6,266,780 B1 | * | 7/2001 | Grundvig et al. | 713/501 |
| 6,275,546 B1 | * | 8/2001 | Miller et al. | 375/354 |
| 6,310,501 B1 | * | 10/2001 | Yamashita | 327/215 |
| 6,323,715 B1 | * | 11/2001 | Vatinel | 327/407 |
| 6,411,135 B1 | * | 6/2002 | Komoto | 327/99 |
| 6,452,426 B1 | * | 9/2002 | Tamarapalli et al. | 327/99 |
| 6,549,030 B1 | * | 4/2003 | Amick et al. | 326/28 |
| 6,600,345 B1 | * | 7/2003 | Boutaud | 327/99 |
| 6,653,867 B1 | * | 11/2003 | Shihadeh | 326/96 |
| 6,784,699 B1 | * | 8/2004 | Haroun et al. | 327/99 |
| 6,806,755 B1 | * | 10/2004 | Simmonds | 327/298 |
| 2001/0043107 A1 | | 11/2001 | Komoto | |

FOREIGN PATENT DOCUMENTS

| | | |
|---|---|---|
| JP | 05-100766 | 4/1993 |
| JP | 10-154022 | 6/1998 |
| JP | 2002332961 A | 11/2002 |

* cited by examiner

Primary Examiner—Timothy P. Callahan
Assistant Examiner—Hai L. Nguyen
(74) Attorney, Agent, or Firm—Volentine Francos & Whitt, PLLC (57) ABSTRACT

A clock switching circuit has a clock output circuit and clock signal transfer circuits. The output circuit provides a selected clock signal. The transfer circuits receive input clock signals and select signals, and output transfer signals to the output circuit. Each of the transfer circuits includes a transmitting circuit, a generating circuit and a passing circuit. The transmitting circuit is connected to the output circuit, and receives the select signal and provides the received select signal responsive to the selected clock signal. The generating circuit is connected to the transmitting circuit, and provides an internal select signal responsive to the received select signal and the input clock signal. The passing circuit is connected to the generating circuit and the output circuit, and provides the input clock signal to the output circuit responsive to the internal select signal.

16 Claims, 5 Drawing Sheets

CLOCK SWITCHING CIRCUIT

BACKGROUND OF THE INVENTION

1. Field of the Invention

The present invention relates to a clock switching circuit for dynamically switching a plurality of clocks.

2. Related Background Art

A clock switching circuit according to a second embodiment in Unexamined Japanese Patent Publication No. 2001-332961 is conventionally present as a circuit wherein no hazard accompanies an output clock signal when a plurality of clocks are switched. According to this conventional example, the technique disclosed is intended to prevent the occurrence of a hazard in the output when a plurality of clock signals are switched.

However, two types of clock signals can not be switched in the circuit disclosed in this publication unless these signals interact with each other. Thus, when this circuit is employed to cope with the switching of an increased number of clocks, such as three or four types, all the clocks must be repeatedly and simultaneously supplied to the circuit, and this constitutes a barrier that forestalls a reduction in the power consumption.

SUMMARY OF THE INVENTION

To resolve this problem, according to the present invention, a clock switching circuit has a clock output circuit and clock signal transfer circuits. The clock output circuit provides a selected clock signal. The clock signal transfer circuits receive input clock signals and select signals. The clock signal transfer circuits output transfer signals to the clock output circuit. Each of the clock signal transfer circuits includes a select signal transfer circuit, an internal select signal generating circuit and a clock signal passing circuit. The select signal transfer circuit is connected to the clock output circuit and receives one of the select signals, and provides the received select signal responsive to the selected clock signal. The internal select signal generating circuit is connected to the select signal transfer circuit, and provides an internal select signal responsive to the received select signal and one of the input clock signals. The clock signal passing circuit is connected to the internal select signal generating circuit and the clock output circuit, and provides the one of the input clock signals to the clock output circuit responsive to the internal select signal.

DETAILED DESCRIPTION OF THE PREFERRED EMBODIMENTS

A clock switching circuit according to the present invention will now be described in detail while referring to the accompanying drawings.

First Preferred Embodiment

Figure 1:
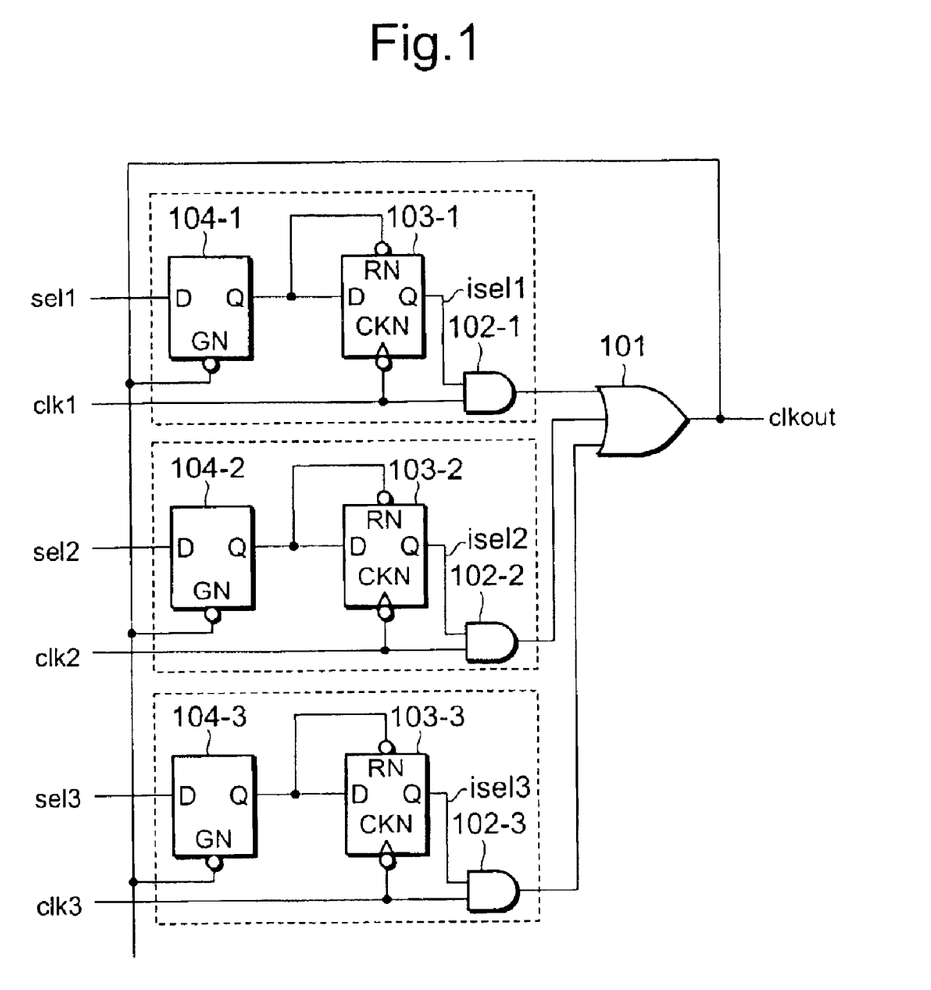
FIG. 1 is a diagram showing the configuration of a clock switching circuit according to a first preferred embodiment of the present invention.

FIG. 1 is a diagram showing the configuration of a clock switching circuit according to a first preferred embodiment of the present invention. In this configuration, three types of clocks, clk1, clk2 and clk3, are switched. The clock switching circuit comprises: a three-input OR gate 101; two-input AND gates 102-1, 102-2 and 102-3; reset-input negative edge operational D flip-flops (hereinafter referred to as D-FFs) 103-1, 103-2 and 103-3, which have terminals for an input signal D, a clock input CKN, an asynchronous reset signal RN and an output signal Q; and low through latches 104-1, 104-2 and 104-3, which have terminals for an input signal D, a gate control signal GN and a gate output signal Q.

In the reset input negative edge operational D-FFs 103-1, 103-2 and 103-3, the gate output signal Q is reset to 0 when the reset input signal RN is 0, and in synchronization with the fall of the clock input CKN, the input signal D is set using the gate output signal Q.

At the low through latches 104-1, 104-2 and 104-3, when the gate control signal GN is 0, the input signal D is output unchanged by the gate output signal Q, and when the gate control signal GN is 1, the value of the gate output signal Q is maintained.

In FIG. 1, signals sel1, sel2 and sel3 are transmitted to the input signal terminals D of the low through latches 104-1, 104-2 and 104-3, and an output clock signal clkout is transmitted to the gate control signal terminals GN. The gate output signals Q of the low through latches 104-1, 104-2 and 104-3 are transmitted to the terminals for the input signals D and the asynchronous reset signals RN of the D-FFs 103-1, 103-2 and 103-3, and clock signals clk1, clk2 and clk3 are transmitted to the clock signal terminals CKN.

The gate output signals Q of the D-FFs 103-1, 103-2 and 103-3 are called isel1, isel2 and isel3. The signals clk1 and isel1 are transmitted to the two-input AND gate 102-1; the signals clk2 and isel2 are transmitted to the two-input AND gate 102-2; and the signals clk3 and isel3 are transmitted to the two-input AND gate 102-3. The output signals of the two-input AND gates 102-1, 102-2 and 102-3 are transmitted as input signals for the three-input OR gate 101, and the output of the three-input OR gate 101 serves as a signal clkout. It should be noted that only one of the signals sel1, sel2 and sel3 is set to level 1 (1-out-of-3) and two or more signals are not set to level 1 at the same time.

Figure 2:
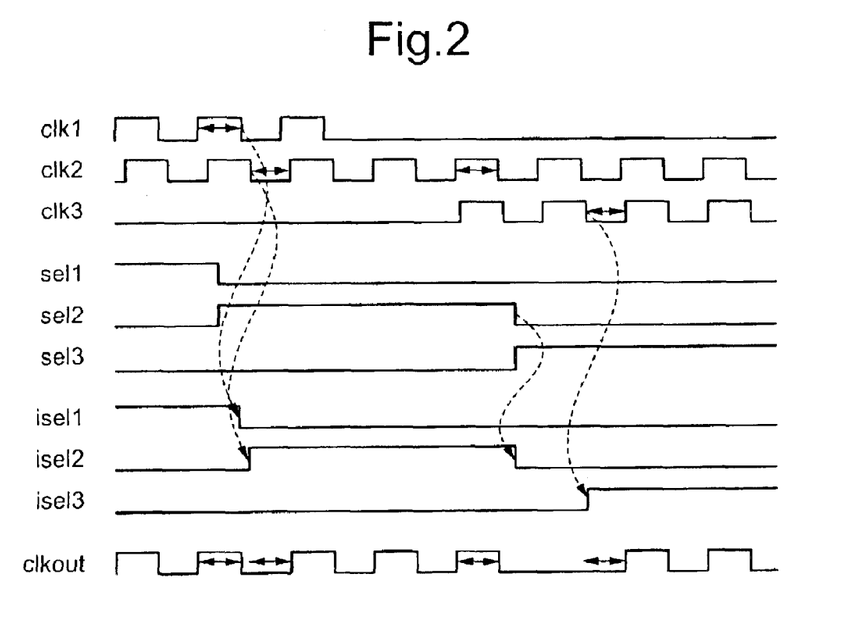
FIG. 2 is a time chart showing the operation of the circuits in FIGS. 1 and 3.

FIG. 2, a time chart for the operation of the circuit in FIG. 1, will now be referred to while an explanation is given for the operation of the circuit. First, while sel1=1 (effective when the clock signal clk1 is selected), sel2=0 and sel3=0 are established, the clock signals clk1 and clk2 are in the operating state and the clock signal clk3 is halted. In this state, since isel1=1 and isel2=isel3=0, only the two-AND gate 102-1 outputs the clock signal clk1, and the three-input OR gate 101 outputs this clock signal clk1 as the signal clkout. Thereafter, the signal clkout is transmitted to the gate control signal terminals GN of the low through latches 104-1, 104-2 and 104-3.

Then, when the above described state is shifted by a controller (not shown) to the state wherein sel1=0, sel2=1 (effective when the clock signal clk2 is selected) and sel3=0, clkout=0 is established for the state wherein clk1=0. Further, the output of the low through latch 104-1 is set to 0, and the asynchronous reset input RN of the D-FF 103-1 is set to 0, so that the state is shifted to isel1=0. Since this change is performed during the period wherein clk1=0, so long as this period is not shorter than the period wherein the state is changed from clk1=0 to clkout=0 to isel1=0, the signal clkout is not output during the period for the next clk1. Furthermore, since the state is not changed to isel1=0 during the period wherein clk1=1, the period for clkout=1, which is output during the last clk1 period, will not be reduced. Thus, no hazard will accompany the signal clkout.

The signal isel2 is set to level 1 when the signal clkout is 0, the gate output signal Q of the low through latch 104-2 is 1, the input signals D of the D-FFs 103 are 1, and the signal clk2 falls thereafter. Since the signal clkout=0 is established before isel2=1 is set, and is maintained during the period wherein clk2=0, even after isel2=1 is established, the period, at the clock switching time, wherein clkout=0 will not be shorter than the period wherein clk2=0, and no hazard is produced. Then, when the clock signal clk2 rises, the signal isel2=1 is established. So long as the period wherein clk2=0 is not extremely short, the state wherein isel2=1 is established before the clock signal clk2 rises, so that the period wherein clkout=1 will not be shorter than the period wherein clk2=1 and no hazard accompanies the signal clkout. Thus, the operation is not adversely affected even when the clock clk3 is halted during the switching from clk1 to clk2.

In this embodiment, only one of the three types of clock signals is selected and changed. Therefore, two or more of the signals sel1, sel2 and sel3 are not set to 1 at the same time.

As is described above, according to the embodiment, the following effects are obtained.

(1) The clocks can be switched without a hazard being produced.

(2) Since even when clocks other than a target clock are halted the clock switching operation is not adversely affected, power consumption can be reduced.

(3) Since a regular structure is employed, the number of clocks to be switched can be easily increased.

(4) Clock select signals can be switched at an arbitrary timing.

Second Preferred Embodiment

Figure 3:
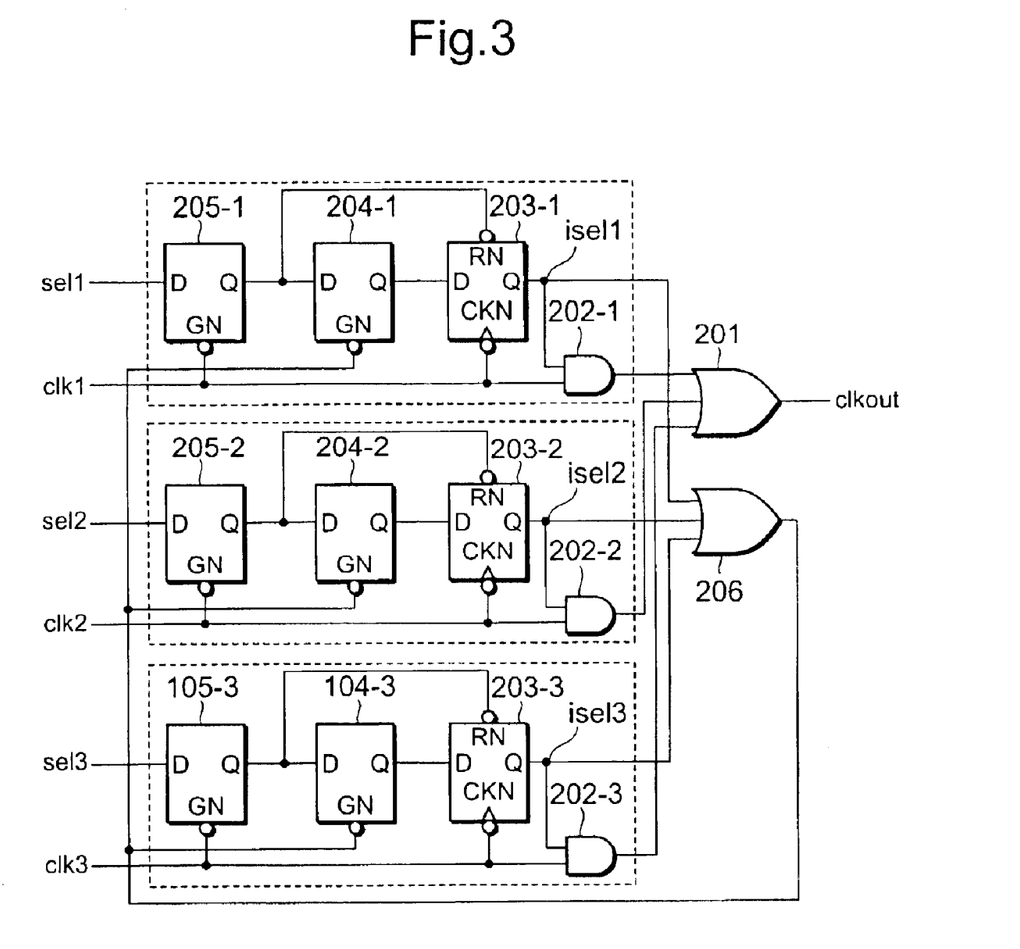
FIG. 3 is a diagram showing the configuration of a clock switching circuit according to a second preferred embodiment of the present invention.

FIG. 3 is a diagram showing the configuration of a clock switching circuit according to a second preferred embodiment of the present invention. The clock switching circuit for this embodiment comprises: three-input OR gates 201 and 206; two-input AND gates 202-1, 202-2 and 202-3; asynchronous reset D-FFs 203-1, 203-2 and 203-3; and low through latches 204-1, 204-2, 204-3, 205-1, 205-2 and 205-3. The D-FFs and the low through latches are the same as those used for the first embodiment.

For the D-FFs 203-1, 203-2 and 203-3, gate output signals Q are reset to 0 when reset input signals RN are 0, and in synchronization with the fall of input clock signals CKN, the values of input signals D are set for output. For the low through latches 204-1, 204-2, 204-3, 205-1, 205-2 and 205-3, input signals D are output unchanged when gate control signals GN are 0, while the values of gate output signals Q are maintained when the gate control signals GN are 1.

Signals sel1, sel2 and sel3 are transmitted to the terminals for the input signals D of the low through latches 205-1, 205-2 and 205-3, and input clock signals clk1, clk2 and clk3 are transmitted to the gate control signal terminals GN. The gate output signals Q of the low through latches 205-1, 205-2 and 205-3 are transmitted to the input signal terminals D of the low through latches 204-1, 204-2 and 204-3, and the output of the three-input OR gate 206 is transmitted to the gate control signal terminals GN.

The gate output signals Q of the low through latches 204-1, 204-2 and 204-3 are transmitted to the input signal terminals D of the D-FFs 203-1, 203-2 and 203-3. The gate output signals Q of the low through latches 205-1, 205-2 and 205-3 are transmitted to the asynchronous reset signal terminals RN, and the clock signals clk1, clk2 and clk3 are transmitted to the clock signal terminals CN. The gate output signals Q are called isel1, isel2 and isel3.

The signals clk1 and isel1 are transmitted to the input terminals of the two-input AND gate 202-1, the signals clk2 and isel2 are transmitted to the input terminals of the two-input AND gate 202-2, and the signals clk3 and isel3 are transmitted to the input terminals of the two-input AND gate 202-3. The output signals of the two-AND gates 202-1, 202-2 and 202-3 are transmitted to the input terminals of the input terminals of the three-input OR gate 201, and the output signal of the three-input OR gate 201 serves as an output clock signal clkout. The signals isel1, isel2 and isel3 are transmitted to the input terminals of the three-input OR gate 206, and the output signal of the three-input OR gate 206 is transmitted to the gate control signal terminals GN of the low through latches 204-1, 204-2 and 204-3.

Each signal sel1, sel2 or sel3 is a clock select signal, which is a 1-out-of-3 signal such that only one of the signals can have a value of 1 at one time.

The operation of the clock switching circuit in FIG. 3 will now be described. Since the operating time chart for this circuit is the same as that in FIG. 2, the time chart in FIG. 2, is employed for explaining the operation.

First, while sel1=1, sel2=0 and sel3=0 are established, the clock signals clk1, clk2 and clk3 are received at respective timings. Since in this state isel1=1, isel2=0 and isel3=0, the two-input AND gates 202-1, 202-2 and 202-3 and the three-input OR gate 201 constitute a multiplexer, which selects the clock signal clk1 and outputs it to the terminal clkout.

When the state is shifted to sel1=0, sel2=1 and sel3=0, while during the period wherein clk1=0, the gate output signal Q of the low through latch 205-1 is changed to 0, as is the reset input signal RN of the D-FF 203-1, so that the state is shifted to isel1=0. This change is performed during the period wherein clk1=0, so long as this period is not shorter than the delay for the low through latch 205-1 and the delay during which the D-FF 203-01 is reset. Therefore, the next clock signal clk1 will not be output to the terminal clkout. Further, since the state is not changed to isel1=0 during the period wherein clk1=1, the period wherein clkout=1, which is output during the last period wherein clk1=1, is not reduced. Thus, no hazard accompanies the signal clkout.

The signal isel2=1 is established when clk2=0 is temporarily established, the gate output signal Q of the low through latch 205-2 is changed to level 1, all the signals isel1, isel2 and isel3 are set to 0, the output of the three-input OR gate 206 is set to 0, the gate output signal Q of the low through latch 204-2 is set to 0, and thereafter, the signal clk2 falls. Since the signal clkout of 0 has already been output before isel2=1 is established, and since clkout=0 is maintained during the period wherein clk2=0, even after the state is changed to isel2=1, the period, at the clock switching time, wherein clkout=0 will not be shorter than the period wherein clk2=0, and no hazard is produced. Since isel2=1 is established when clk2 falls, the period wherein clkout=1 is not shorter than the period wherein clk2=1, and no hazard accompanies the signal clkout. The clock signal clk3 may be halted while the clock signal clk1 is switched to the clock signal clk2, because the signal clk3 does not adversely affect the operation.

When the correct input condition (1-out-of-3) for the signals sel1, sel2 and sel3 is not satisfied, and a plurality of these signals sel are simultaneously set to 1, as is shown in FIG. 3, sel1=1, sel2=0 and sel3=0 and isel1=1, isel2=0 and isel3=0 are established. Even when sel2 and sel3 are changed to 1 while the clock signal clk1 is selected, the output of the three-input OR gate 206 is 1, so that the gate output signals Q of the low through latches 204-2 and 204-3 are maintained as 0. Therefore, the signals isel2 and isel3 do not change to 1, and the clock signal clk2 or clk3 is not included in the signal clkout. This is compensated for so long as a plurality of the clock select signals sel1, sel2 and sel3 are not 0 when all the clocks have not been selected, i.e., isel1=0, isel2=0 and isel3=0 is established.

As is described above, according to the second embodiment, in addition to the effects obtained in the first embodiment, even when the clock select signal does not correspond to the 1-out-of-3 condition, the output of an abnormal clock does not occur so long as two or more select signals are not effective at the same time when all the clocks are not selected.

Third Preferred Embodiment

Figure 4:
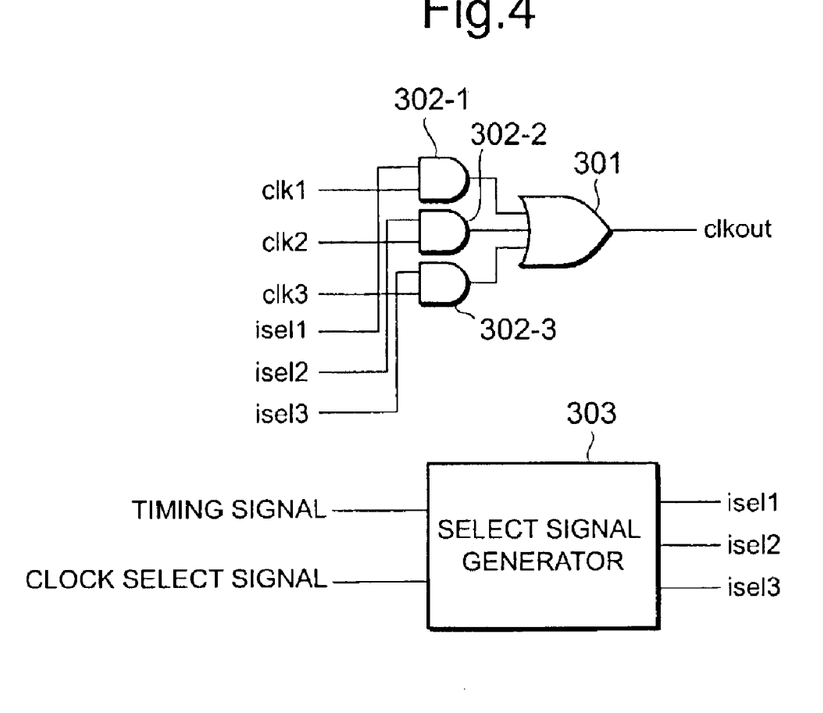
FIG. 4 is a diagram showing the configuration of a clock switching circuit according to a third preferred embodiment of the present invention.

FIG. 4 is a diagram showing the configuration of a clock switching circuit according to a third preferred embodiment of the present invention. This diagram is a circuit diagram that is more generalized than are those in FIGS. 1 and 3. According to this circuit, input clocks are clk1, clk2 and clk3, internal select signals are isel1, isel2 and isel3, and an output clock is clkout. A select signal generator 303 receives a timing signal and a clock select signal, and generates internal select signals.

The clock switching circuit for this embodiment comprises: a three-input OR gate 303, and two-input AND gates 302-1, 302-2 and 302-3. The two-input AND gates 302-1, 302-2 and 302-3 respectively receive the clock signals clk1, clk2 and clk3 and the internal select signals isel1, isel2 and isel3, and transmit the output signals to the three-input OR gate 301. The output of the three-input OR gate 301 serves as the output clock clkout.

Figure 5:
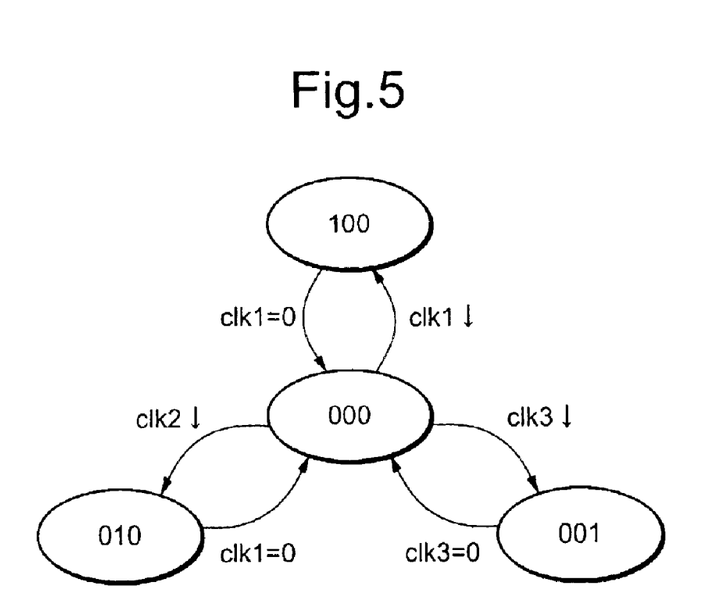
FIG. 5 is a diagram showing the shifting of the state of internal select signals generated by a select signal generator in FIG. 4.

The internal select signal (isel1, isel2, isel3) can be either a 1-out-of-3 signal of (1, 0, 0), (0, 1, 0) or (0, 0, 1), or the initial state (0, 0, 0), wherein all the signals are 0, and this state change is shown in FIG. 5.

As is shown in FIG. 5, only when the clock signals clk1, clk2 and clk3 are falling can the state (initial state) of (isel1, isel2, isel3)=(0, 0, 0) be changed to each of the states (1, 0, 0), (0, 1, 0) and (0, 0, 1). Further, only when clk1=0 is established can the state (isel1, isel2, isel3)=(1, 0, 0) be changed to isel1=0. Similarly, only when clk2=0 can the state (0, 1, 0) be changed to isel2=2, and only when clk3=0 can the state (0, 0, 1) be changed to isel3=0.

The select signal generator 303 employs the timing signal and the clock select signal to generate the internal select signals isel1, isel2 and isel3 that satisfy the above condition.

The timing signals correspond to the signals clk1, clk2, clk3 and clkout in the first embodiment, or the signals clk1, clk2 and clk3 and the output of the three-input OR gate 206 that receives the signals isel1, isel2 and isel3 in the second embodiment. It should be noted, however, that these are merely examples, and another combination of signals may be employed. Furthermore, while the clock select signals sel1, sel2 and sel3 are used in the first and second embodiments, these are not always 1-out-of-3 signals.

Figure 6:
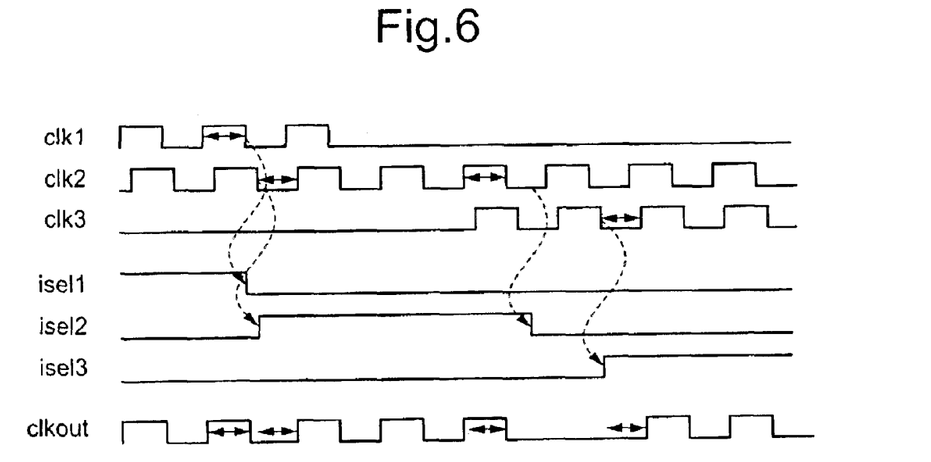
FIG. 6 is a time chart showing the operation of the circuit in FIG. 4.
Figure 7:
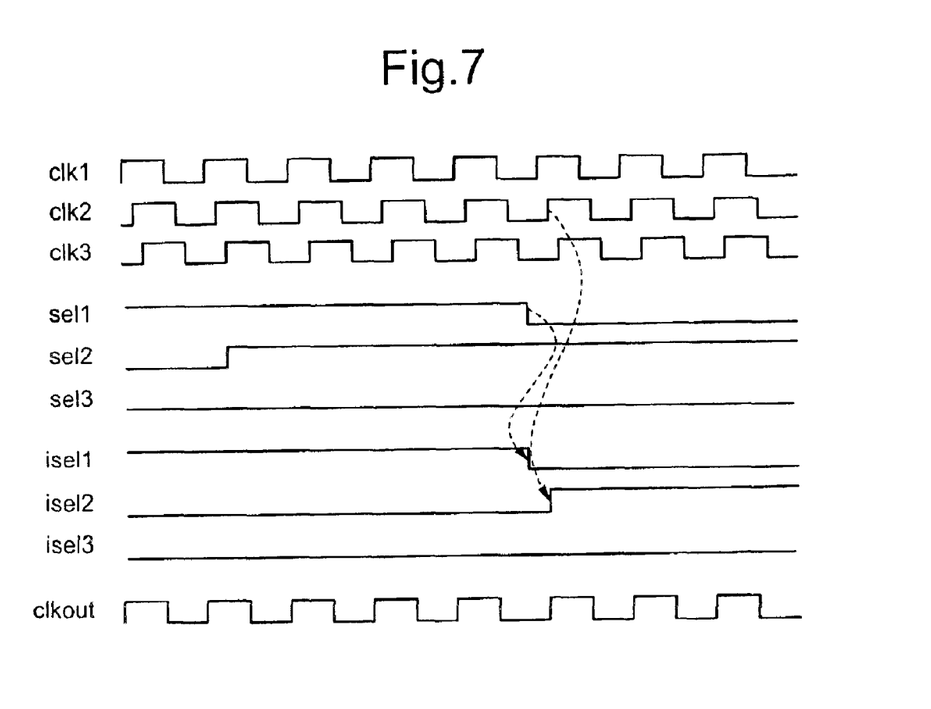
FIG. 7 is a time chart for when a plurality of signals sel are simultaneously selected.

FIG. 6 is a time chart for the operation of the clock switching circuit in FIG. 4. The operation of the clock switching circuit in FIG. 4 will now be described while referring to FIG. 6.

First, in the state wherein (isel1, isel2, isel3)=(1, 0, 0), the clock signals clk1, clk2 and clk3 are received at the individual timings. In this state, the two-input AND gates 302-1, 302-2 and 302-3 and the three-input OR gate 301 constitute a multiplexer, which selects the signal clk1 and outputs it to the terminal clkout.

The clock signal is changed from the signal clk1 to clk2, and the select signal generator 303 shifts isel1 to 0 during the period wherein clk1 is 0. Since this shifting is performed during the period wherein clk1=0, the next clk1=1 is not output to the terminal clkout so long as between the select signals there are no great delay differences. Further, the period wherein clkout=1, which is output in the last period of clk1, is not reduced. Therefore, no hazard accompanies the output clock clkout. In this manner, the state (0, 0, 0) is obtained in the internal state shifting diagram.

The select signal generator 303 sets isel2 to 1 when the falling of the signal clk2 occurs once or more after all the clocks have not been selected. As a result, the period wherein clkout=0 at the clock switching time will not be shorter than the period wherein clk2=0, and no hazard is produced. Then, when the signal clk2 falls, isel2=1 is established, and since isel2=1 is set before the signal clk2 rises, so long as the period wherein clk2=0 is not extremely short, the period wherein clkout=1 will not be shorter than the period wherein clk2=1, and no hazard will accompany the clock clkout. The signal clk3 may be halted during the period wherein the signal clk1 is switched to clk2 because the signal clk3 does not adversely affect the operation.

As is described above, according to the effects obtained by the third embodiment, (1) the clocks can be switched without a hazard occurring, and (2) a clock other than the clocks to be switched can be halted.

The present invention is not limited to these preferred embodiments, and can be variously modified based on the subject of the invention. For example, in the third embodiment, other gates, such as NAND gates, may be used to replace the three-input OR gate and the two-input AND gates.

Further, the clocks have been switched in the state wherein clkout=0. But when the three-input OR gate 301 is replaced with an AND gate, the two-input AND gates 302 are replaced with OR gates, and the internal select signals isel1, isel2 and isel3 are changed to 2-out-of-3 signals of (0, 1, 1), (1, 0, 1) or (1, 1, 0), or signals of (1, 1, 1), the clocks can be switched in the state wherein clkout=1.

In addition, although only three types of clocks have been employed for the first to third embodiment, an arbitrary number of clocks may be employed.

What is claimed is:

1. A clock switching circuit comprising:
   a clock output circuit providing a selected clock signal; and a plurality of clock signal transfer circuits receiving a plurality of input clock signals and a plurality of select signals, and outputting a plurality of transfer signals to the clock output circuit, each of the clock signal transfer circuits including a select signal transfer circuit connected to the clock output circuit, the select signal transfer circuit receiving one of the select signals and providing the received select signal responsive to the selected clock signal, an internal select signal generating circuit connected to the select signal transfer circuit, the internal select signal generating circuit providing an internal select signal responsive to the received select signal output from the select signal transfer circuit and one of the input clock signals, wherein the internal select signal generating circuit is a D flip-flop having an input signal terminal connected to receive the received select signal output from the select signal transfer circuit, an asynchronous reset signal terminal connected to receive the received select signal output from the select signal transfer circuit, a clock input terminal connected to receive one of the input clock signals, and an output signal terminal providing the internal select signal, and a clock signal passing circuit connected to the internal select signal generating circuit and the clock output circuit, the clock signal passing circuit providing the one of the input clock signals to the clock output circuit as a respective one of the transfer signals, responsive to the internal select signal.

2. A clock switching circuit according to claim 1, wherein only one of the select signals is provided as having an enable level, while others of the select signals are provided as having a disable level.

3. A clock switching circuit according to claim 1, wherein the clock output circuit is a gate circuit having a plurality of input terminals respectively connected to the clock signal transfer circuits, and an output terminal for providing the selected clock signal.

4. A clock switching circuit according to claim 1, wherein the select signal transfer circuit is a low through latch circuit having an input terminal connected to receive the one of the select signals, an output terminal for providing the received select signal and a control terminal connected to receive the selected clock signal provided by the clock output circuit.

5. A clock switching circuit according to claim 1, wherein the clock signal passing circuit is a gate circuit having a first input terminal connected to the internal select signal generating circuit, a second input terminal connected to receive the one of the input clock signals and an output terminal connected to the clock output circuit.

6. A clock switching circuit comprising:

a clock output circuit providing a selected clock signal;

a transfer permit circuit providing a transfer permitting signal; and a plurality of clock signal transfer circuits receiving a plurality of input clock signals, a plurality of select signals and the transfer permitting signal, and outputting a plurality of transfer signals to the clock output circuit, each of the clock signal transfer circuits including a first select signal transfer circuit receiving one of the select signals and one of the input clock signals, and providing the received select signal responsive to the one of the input clock signals, a second select signal transfer circuit connected to the first select signal transfer circuit and the transfer permit circuit, the second select signal transfer circuit passing the received select signal provided from the first select signal transfer circuit responsive to the transfer permitting signal, an internal select signal generating circuit connected to the second select signal transfer circuit, the internal select signal generating circuit providing an internal select signal responsive to the received select signal passed by the second select transfer circuit and the one of the input clock signals, and a clock signal passing circuit connected to the internal select signal generating circuit and the clock output circuit, the clock signal passing circuit providing the one of the input clock signals to the clock output circuit as a respective one of the transfer signals, responsive to the internal select signal.

7. A clock switching circuit according to claim 6, wherein the transfer permit circuit provides the transfer permitting signal responsive to the internal select signals.

8. A clock switching circuit according to claim 7, wherein the transfer permit circuit is a gate circuit having a plurality of input terminals respectively connected to the internal select signal generating circuits, and an output terminal for providing the transfer permitting signal.

9. A clock switching circuit according to claim 6, wherein the clock output circuit is a gate circuit having a plurality of input terminals respectively connected to the clock signal transfer circuits, and an output terminal for providing the selected clock signal.

10. A clock switching circuit according to claim 6, wherein the first select signal transfer circuit is a low through latch circuit having an input terminal connected to receive the one of the select signals, an output terminal for providing the received select signal and a control terminal connected to receive the one of the input clock signals.

11. A clock switching circuit according to claim 6, wherein the second select signal transfer circuit is a low through latch circuit having an input terminal connected to receive the received select signal provided from the first select signal transfer circuit, an output terminal for passing the received select signal and a control terminal connected to receive the transfer permitting signal from the transfer permit circuit.

12. A clock switching circuit according to claim 6, wherein the internal select signal generating circuit is a flip-flop circuit having an input terminal connected to the second select signal transfer circuit, an output terminal for providing the internal select signal and a clock input terminal connected to receive the one of the input clock signals.

13. A clock switching circuit according to claim 6, wherein the clock signal passing circuit is a gate circuit having a first input terminal connected to the internal select signal generating circuit, a second input terminal connected to receive the one of the input clock signals and an output terminal connected to the clock output circuit.

14. A clock switching circuit comprising:

a clock output circuit having a plurality of input terminals and an output terminal for providing a selected clock signal;

a plurality of clock signal passing circuits each of which has a first input terminal connected to receive one of a plurality of input clock signals and a second input terminal connected to receive one of a plurality of internal select signals, and an output terminal connected to one of the input terminals of the clock output circuit; and an internal select signal generating circuit connected to the second input terminals of the clock signal passing circuits, the internal select signal generating circuit having a first state at which the internal select signal generating circuit generates the internal select signals each of which having a non-select state, and a plurality of second states at which the internal select signal generating circuit generates the internal select signals so that only one of the internal select signals has a select state while others of the internal select signals have the non-select state, wherein the internal select signal generating circuit includes a D flip-flop having an input signal terminal connected to receive a select signal, an asynchronous reset signal terminal connected to receive the select signal, a clock input terminal connected to receive one of the input clock signals, and an output signal terminal providing an internal select signal, wherein the internal select signal generating circuit changes state when the selected clock signal has a first level, and wherein the internal select signal generating circuit changes between the first and second states alternatively.

15. A clock switching circuit according to claim 14, wherein the internal select signal generating circuit changes state responsive to the one of the input clock signals and the select signal.

16. A clock switching circuit according to claim 14, wherein the clock signal passing circuits are gate circuits.

* * * * *